(12) United States Patent
Hodge

(10) Patent No.: US 8,478,979 B2
(45) Date of Patent: Jul. 2, 2013

(54) DISABLE A FEATURE OF A COMPUTING MACHINE

(75) Inventor: Richard H. Hodge, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 12/878,681

(22) Filed: Sep. 9, 2010

(65) Prior Publication Data

US 2012/0066486 A1 Mar. 15, 2012

(51) Int. Cl.
*G06F 9/00* (2006.01)
*G06F 15/177* (2006.01)

(52) U.S. Cl.
USPC .................. 713/100; 713/1; 713/2; 713/300; 455/411

(58) Field of Classification Search
USPC .......................... 713/1, 2, 100, 300; 455/411
See application file for complete search history.

(56) References Cited

U.S. PATENT DOCUMENTS

| 5,631,912 | A | * | 5/1997 | Mote, Jr. | 714/727 |
| 5,978,860 | A | * | 11/1999 | Chan et al. | 710/8 |
| 6,065,081 | A | * | 5/2000 | Stancil et al. | 710/104 |
| 6,202,121 | B1 | | 3/2001 | Walsh et al. | |
| 6,298,447 | B1 | | 10/2001 | Wang et al. | |
| 8,125,986 | B2 | * | 2/2012 | Narayanaswami et al. | 370/360 |
| 2002/0090931 | A1 | * | 7/2002 | Papineau et al. | 455/411 |
| 2008/0233919 | A1 | * | 9/2008 | Kenney | 455/411 |
| 2009/0037610 | A1 | * | 2/2009 | Krancher et al. | 710/10 |
| 2010/0010706 | A1 | * | 1/2010 | Gormley | 701/33 |

* cited by examiner

*Primary Examiner* — Vincent Tran
(74) *Attorney, Agent, or Firm* — Chun-Liang Kuo

(57) ABSTRACT

Managing a computing machine including detecting a signal to disable a feature of the computing machine through an interface of the computing machine, identifying at least one component of the computing machine utilized by the feature in response to receiving the signal, and accessing a hardware switch corresponding to at least one of the identified components to disable the feature.

19 Claims, 7 Drawing Sheets

DISABLE A FEATURE OF A COMPUTING MACHINE

BACKGROUND

When managing features on one or more computing machines, a user can initially select one of the computing machines and proceed to physically access the computing machine. The user can then tailor the computing machine to support preferred features by configuring one or more settings on the computing machine. Once the user has configured the computing machine, the user can move to the next computing machine and repeat the process for each of the remaining computers until the computing machines have been tailored to include or utilize the preferred feature.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By detecting a signal to disable a feature of a computing machine through an interface of the computing machine, one or more components of the computing machine utilized by the feature can accurately be identified. Additionally, by accessing a component switch corresponding to at least one of the identified components to disable the feature, the computing machine can efficiently be managed. As a result, a secure and user friendly environment can be created as one or more features of the computing machine are locally or remotely managed.

Figure 1:
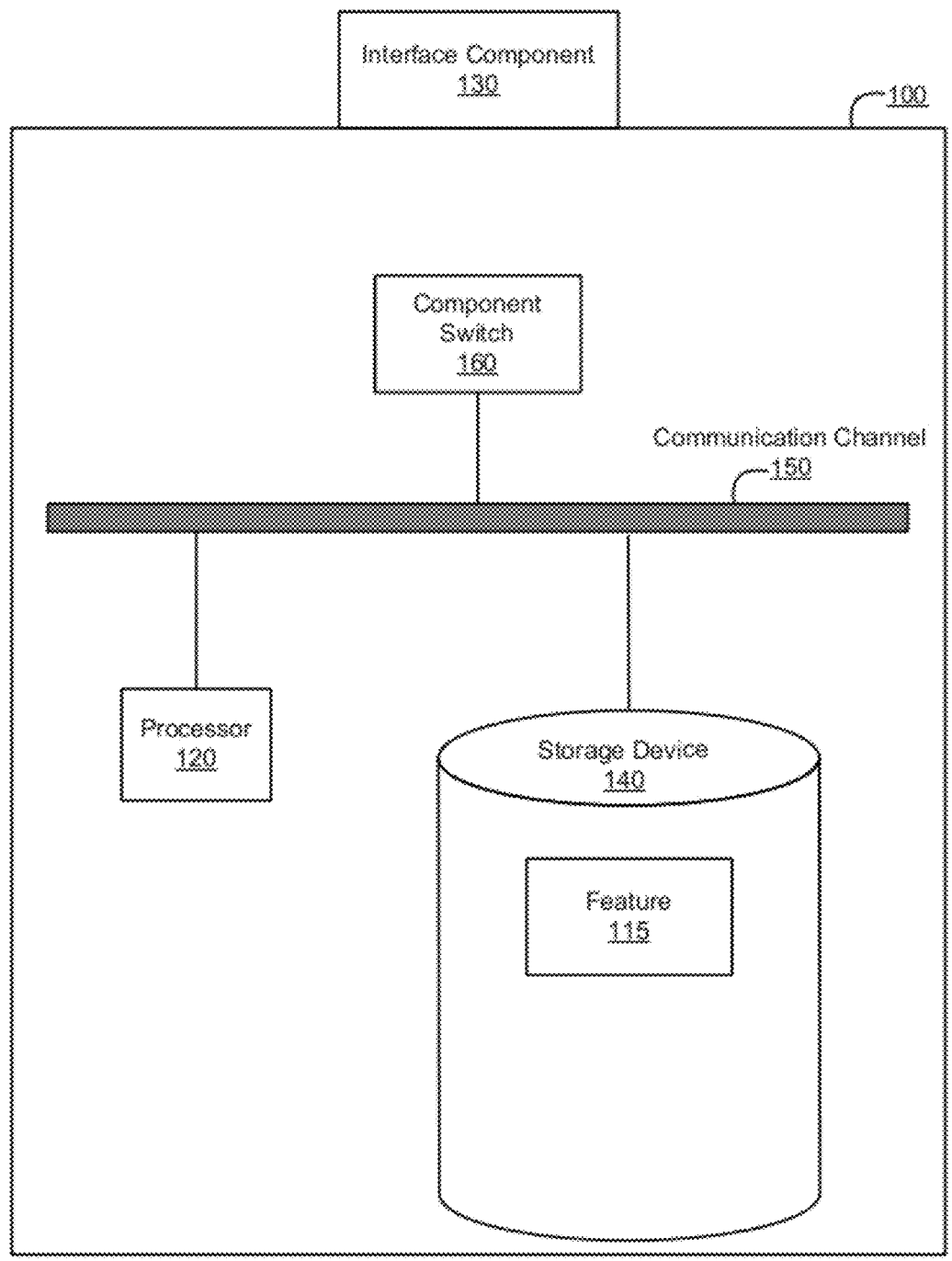
FIG. 1 illustrates a computing machine coupled to an interface component and a component switch according to an embodiment.

FIG. 1 illustrates a computing machine 100 coupled to an interface component 130 and a component switch 160 according to an embodiment. In one embodiment, the computing machine 100 can be a desktop, a laptop, a tablet, a netbook, a notebook, an all-in-one system, a server, and the like. In another embodiment, the computing machine 100 can be a cellular device, a PDA (Personal Digital Assistant), and/or any additional computing machine which can include an interface component 130 and/or a component switch 160.

As illustrated in FIG. 1, the computing machine 100 includes a processor 120, an interface component 130, a component switch 160, a storage device 140, and a communication channel 150 for the computing machine 100 and/or one or more components of the computing machine 100 to communicate with one another. As shown in FIG. 1, the storage device 140 can include one or more features 115 supported by the computing machine 100. In one embodiment, the storage device 140 further includes a feature application. In other embodiments, the computing machine 100 includes additional components and/or is coupled to additional components in addition to and/or in lieu of those noted above and illustrated in FIG. 1.

As noted above, the computing machine 100 includes a processor 120. The processor 120 can send data and/or instructions to the components of the computing machine 100, such as interface component 130, the component switch 160, and the feature application. Additionally, the processor 120 can read or receive data and/or instructions from components of the computing machine 100, such as the interface component 130, the component switch 160, and the feature application.

The feature application is an application which can be utilized in conjunction with the processor 120 to control or manage one or more features 115 of the computing machine 100. In one embodiment, the feature application is a BIOS (Basic Input/Output System) of the computing machine 100. For the purposes of this application, a feature 115 includes a mode of operation of the computing machine 100 which uses one or more components of the computing machine 100. In one embodiment, one or more features 115 can include a display feature, an entertainment feature, a power feature, an audio feature, a communication feature, an input feature, and/or an output feature.

When managing a feature, the processor 120 and/or the feature application can use the interface component 130 to detect a signal to disable a feature of the computing machine 100. For the purposes of this application, the interface component 130 is a communication device which can detect and/or receive one or more signals and/or instructions from a device. In one embodiment, the interface component 130 can additionally send one or more signals and/or instructions to the device. The device can include a computing machine, a handheld device, and/or any additional device which can communicate with the interface component 130 through one or more signals.

One or more of the signals and/or instructions can include a feature signal to disable or enable one or more features. In one embodiment, one or more of the feature signals can list which components of the computing machine 100 are used or supported by the feature. In another embodiment, the computing machine 100 can include a feature list which includes one or more features 115 available to the computing machine 100 and one or more components which are used or supported by the corresponding feature 115.

In response to receiving a signal to disable a feature 115 of the computing machine 100, processor 120 and/or the feature application can proceed to identify at least one component of the computing machine 100 utilized by the feature 115. One or more of the components can include a graphics component, a sound component, a network component, an input component, an optical device, a storage device, and/or a display device. In other embodiments, additional components of the computing machine 100 are configured to be utilized and/or supported by a feature 115 in addition to and/or in lieu of those noted above.

In response to identifying one or more components which are used by the feature 115, the processor 120 and/or the feature application access at least one component switch 160 corresponding to at least one of the identified components. A component switch 160 includes a software, hardware, and/or mechanical switch which enables and/or disables at least one component in response to being accessed. In one embodiment, when disabling or enabling a component, the component switch 160 can turn on or turn off at least one of the components in response to being accessed. By accessing the component switch 160, the corresponding components can be disabled and/or powered down. As a result, by disabling the components used by a feature 115, the corresponding feature 115 becomes disabled.

The feature application can be firmware which is embedded onto the processor 120, the computing machine 100, and/or the storage device 140. In another embodiment, the feature application is a BIOS of the computing machine or the feature application is a software application stored on the computing machine 100 within ROM or on the storage device 140 accessible by the computing machine 100. In other embodiments, the feature application is stored on a computer readable medium readable and accessible by the computing machine 100 or the storage device 140 from a different location.

In one embodiment, the storage device 140 is included in the computing machine 100. In other embodiments, the storage device 140 is not included in the computing machine 100, but is accessible to the computing machine 100 utilizing a network interface included in the computing machine 100. The network interface can be a wired or wireless network interface card. In other embodiments, the storage device 140 can be configured to couple to one or more ports or interfaces on the computing machine 100 wirelessly or through a wired connection.

In a further embodiment, the feature application can be stored and/or accessed through a server coupled through a local area network or a wide area network. The feature application communicates with devices and/or components coupled to the computing machine 100 physically or wirelessly through a communication bus 150 included in or attached to the computing machine 100. In one embodiment the communication bus 150 is a memory bus. In other embodiments, the communication bus 150 is a data bus.

Figure 2:
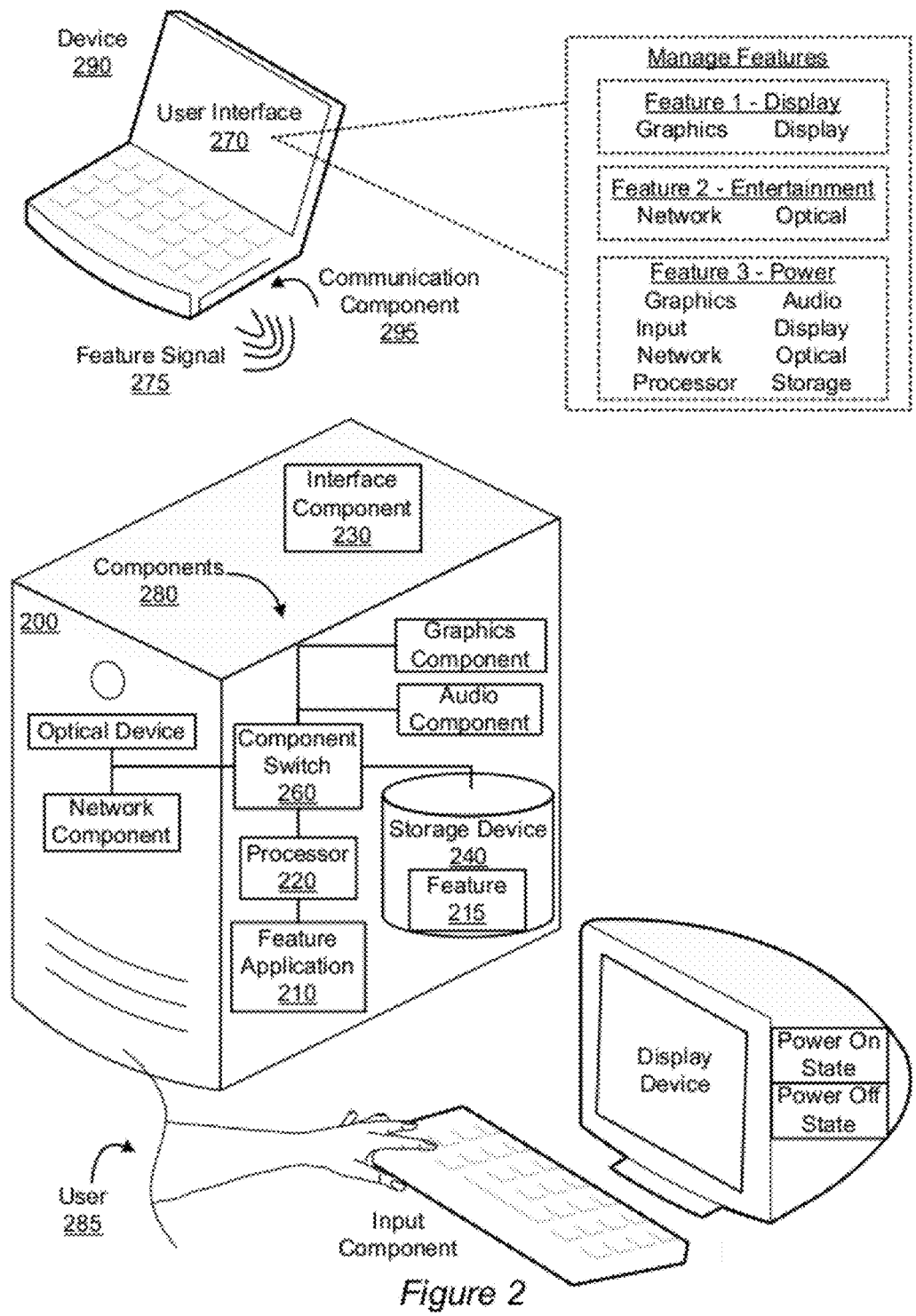
FIG. 2 illustrates a computing machine with at least one component switch according to an embodiment.

FIG. 2 illustrates a computing machine 200 with at least one component switch 260 according to an embodiment. As noted above, a component switch 260 can be a hardware, software, and/or mechanical component configured to enable or disable a feature 215 of the computing machine 200. When enabling or disabling a feature 215, a component switch 260 can enable or disable one or more components 280 of the computing machine 200 which are used or supported by the feature 215.

In response to disabling a feature 215, a user 285 of the computing machine 200 can be restricted from using the feature 215 and the corresponding components 280 on the computing machine 200. Additionally, in response to enabling a feature 215, the user 280 can be allowed to use the feature 215 and the corresponding components 280 on the computing machine 200. As a result, a parent, a teacher, and/or any additional user can manage the computing machine 200 by setting limits or granting access to features 215 of the computing machine 200.

As illustrated in FIG. 2, one or more components 280 of the computing machine 200 can include an interface component 230, an optical drive, a network component, a graphics component, an audio component, a storage device 240, a processor 220, an input component, and/or a display device. In other embodiments, the computing machine 200 can include additional components which can be used by a feature 215 and can be enabled or disabled using at least one component switch 260 in addition to and/or in lieu of those noted above and illustrated in FIG. 2.

As illustrated in FIG. 2, a component switch 260 can be coupled to one or more components 280 of the computing machine. In one embodiment, the component switch 260 includes one or more sub switches which correspond to each of the components 280 of the computing machine 200. When enabling or disabling one or more of the components 280, the processor 220, the feature application 210, and/or the component switch 260 can access the corresponding sub switch to enable or disable the corresponding component 280.

When enabling a component 280, a corresponding sub switch can be in an on state. If the corresponding sub switch is in an on state, the corresponding component 280 can be enabled. In one embodiment, when the component 280 is enabled, the corresponding component 280 is powered on and is coupled to a communication bus of the computing machine 200. When the component 280 is enabled, the component 280 can appear to be installed or initialized to the computing machine 200.

When disabling a component 280, the corresponding sub switch can be in an off state. If the corresponding sub switch is in an off state, the corresponding component can be disabled. In one embodiment, when the component 280 is disabled, the corresponding component 280 can be powered off. In another embodiment, when the component is disabled, the corresponding component 280 can be in a low power state. In other embodiments, when the component is disabled, the corresponding component 280 can be decoupled from a communication bus of the computing machine 200. When the component 280 is disabled, the component 280 can appear to be uninstalled or uninitialized to the computing machine 200.

In other embodiments, the computing machine 200 can include a component switch 260 for each of the components 280 of the computing machine 200. When more than one component switch 260 is included in the computing machine 200, each of the component switches 260 will include an on state and an off state. When a corresponding component switch 260 is in an on state, the corresponding component 280 can be enabled and/or powered on. When a corresponding component switch 260 is in an off state, the corresponding component can be disabled, enter a low power state, powered off, and/or be decoupled from a communication bus of the computing machine 200.

As noted above, at least one of the component switches 260 can be accessed in response to an interface component 230 of the computing machine 200 detecting a feature signal 275 from a device 290. As shown in the present embodiment, a feature signal 275 can be received by an interface component 230 of the computing machine 200. The feature signal 275 can be a digital or analog signal which can be generated and sent as a wireless signal or as a wired signal by a device 290.

As noted above, the feature signal 275 specifies whether to disable or enable one or more features 215 on the computing machine 200. In one embodiment, the feature signal 275 can further list which of the components 280 of the computing machine 200 are used or supported by the corresponding feature 215. In another embodiment, the feature signal 275 can also specify a time for the corresponding feature 215 to become enabled or disabled. In other embodiments, the feature signal 275 specifies a duration of time for the corresponding feature 215 to remain enabled or disabled.

As illustrated in FIG. 2, the computing machine 200 receives one or more feature signals 275 through an interface component 230. As noted above, the interface component 230 is a communication device or component configured to couple the computing machine 200 with the device 290 and detect one or more feature signals 275 from the device 290. The interface component 230 can couple the computing machine 200 to the device 290 through a wireless connection or through a wired connection. Additionally, the interface component 230 can be coupled or mounted to one or more locations on the computing machine 200.

In one embodiment, the interface component 230 can be a USB (Universal Serial Bus) interface, a serial device interface, a SATA (Serial Advanced Technology Attachment) interface, an ESATA (External Serial Advanced Technology Attachment) interface, a PCI (Peripheral Component Interconnect) interface, a PCIE (Peripheral Component Interconnect Express) interface, IDE (Integrated Drive Electronics) interface, a 1394 (Firewire) interface, a network interface, and/or a port replicator. In another embodiment, the interface component 230 can include wireless components or devices configured to wirelessly detect one or more feature signals 275. In other embodiments, the interface component 230 can include additional types of components configured to detect a feature signal 275 from the device 290.

The device 290 can be a laptop, a hand device, and/or any additional computing machine which can couple with the computing machine 200 and send one or more feature signals 275 through a communication component 295 of the device 290. The communication component 295 is a device or component configured to send or broadcast one or more feature signals 275 to the computing machine 200.

In one embodiment, the communication component 295 can be a USB component, a SATA component, an ESATA component, a PCI component, a PCIE component, an IDE component, a Firewire component, a serial component and/or a port replicator component. In another embodiment, the communication component 295 can include wireless components or devices configured to wirelessly send the computing machine 200 one or more feature signals 275.

As illustrated in FIG. 2, the device 290 can include a user interface 270 configured to allow the device 290 or a user of the device 290 to manage one or more features 215 of the computing machine 200. The user interface 270 can be rendered as a graphical display which lists one or more of the features 215 available on the computing machine 200. Additionally, the user interface 270 can list one or more components 280 of the computing machine 200 which are used or supported by a corresponding feature 215.

The device 290 and/or a user of the device 290 can select one or more features 215 listed on the user interface 270 using an input component of the device 290. In response to selecting one or more of the features 215, the communication component 295 of the device 290 proceeds to broadcast a feature signal 275 specifying for the selected feature 215 to be enabled or disabled.

Figure 3:
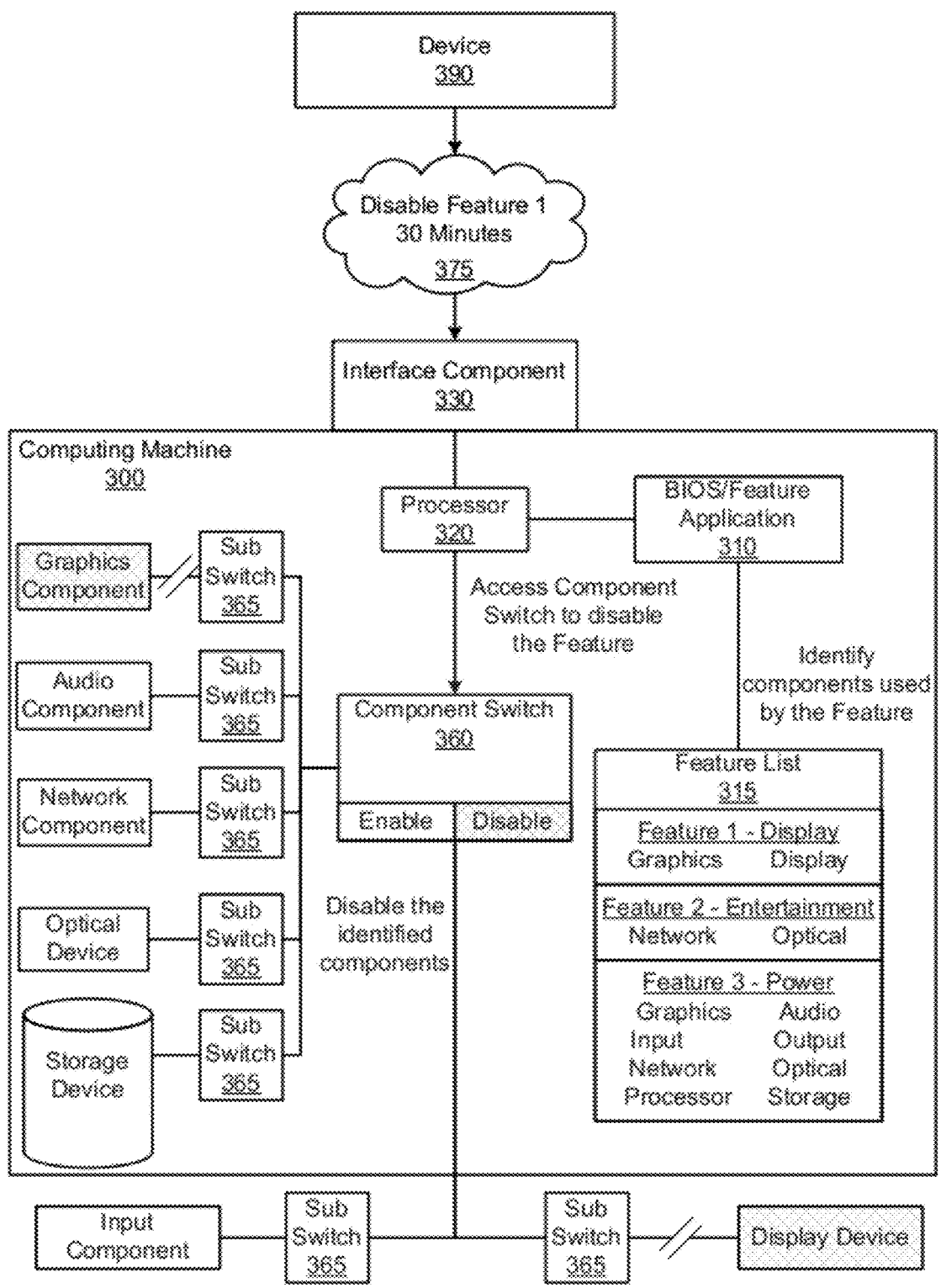
FIG. 3 illustrates a block diagram of a feature application managing features of a computing machine according to an embodiment.

FIG. 3 illustrates a block diagram of a feature application 310 managing features of a computing machine 300 according to an embodiment. As noted above, in one embodiment, the feature application 310 can be a BIOS of the computing machine 300. As illustrated in the present embodiment, the interface component 330 has detected a device 390 coupling to the computing machine 300 and a feature signal 375 from the device 390. In response to coupling to the device 390 and detecting the feature signal 375, the processor 320 and/or the BIOS 310 proceed to determine which of the features of the computing machine 300 to enable or disable.

In one embodiment, in response to the device 390 coupling to the computing machine 300, the BIOS 310 and/or the processor 320 can initially authenticate the device 390 before determining detecting the feature signal 375 from the device 390. When authenticating the device 390, the BIOS 310 and/or the processor 320 can prompt the device 390 to provide an authentication. The authentication can be or include an identification, a password, a key, and/or an authorization. In response to receiving the authentication, the BIOS 310 and/or the processor 320 can compare the received authentication to a predefined authentication. If the received authentication matches the predefined authentication, the device 390 will have been authenticated.

The BIOS 310 and/or the processor 320 can then instruct the interface component 330 to detect one or more feature signals 375 from the device 390. As noted above, the interface component 330 has detected feature 375 from the device 390. In response the BIOS 310 and/or the processor proceed to analyze the feature signal 375 to determine which of the features of the computing machine 300 to enable or disable. As illustrated in FIG. 3, the BIOS 310 and/or the processor 320 determine that the feature signal 375 specifies for Feature 1 to be disabled for 30 minutes.

In response to determining that Feature 1 is to be disabled, the BIOS 310 and/or the processor 320 proceed to access a feature list 315 to identify components which are utilized by Feature 1. The feature list 315 can be a list, file, and/or database which include one or more features supported by the computing machine 300. Additionally, the feature list 315 can list one or more components which are utilized by each of the features included in the list. The feature list 315 can be stored on one or more locations on the computing machine 300, such as the storage device 340. In another embodiment, the feature list 315 can be embedded onto a ROM of the computing machine 300 or the feature list 315 can be stored at a location outside of the computing machine 300 and accessible to the processor 320 and/or the BIOS 310.

By accessing the feature list 315, the processor 320 and/or the BIOS 310 can identify which components of the computing machine 300 are utilized or supported by Feature 1 and which components of the computing machine 300 are not utilized or supported by Feature 1. As illustrated in FIG. 3, the feature list 315 specifies that Feature 1 is used in a display mode of operation. The feature list 315 also specifies that the graphics component and the display component are utilized by Feature 1.

As a result, the BIOS 310 and/or the processor 320 determine that the graphics component and the display component are to be disabled. Additionally, the BIOS 310 and/or the processor 320 determine that the audio component, the network component, the optical drive, the storage device, and the input device are not listed to be used in Feature 1. As a result, the processor 320 and/or the BIOS 310 will not disable them.

In response to the BIOS 310 and/or the processor 320 identifying which components to disable and which of the component to leave enabled, the BIOS 310 and/or the processor 320 proceed to access the component switch 360 and instructs the component switch 360 to disable the graphics component and the display component. The BIOS 310 and/or the processor 320 can access the component switch 360 and instruct the component switch 360 using one or more GPIO (general purposes input/output) signals.

As illustrated in FIG. 3, in response to the component switch 360 being accessed, the component switch 360 proceeds to disable the graphics component and the display device. In one embodiment, the component switch 360 includes sub switches 365 for each of the components of the computing machine 300. As illustrated in FIG. 3, the component switch 360 can access a sub switch 365 corresponding to the graphics component and proceed to switch the sub switch 365 to an off state. Additionally, the component switch 360 can access a sub switch 365 corresponding to the display device and proceed to switch the sub switch 365 to an off state. In response to disabling the graphics component and the display component, Feature 1 becomes disabled. As noted above, when disabled, the graphics component and the display component can be powered off or enter a low power state.

As noted above, the feature signal 375 specified for Feature 1 to be disabled for 30 minutes. In one embodiment, the processor 320 and/or the BIOS 310 can set a timer and proceed to access the component switch 360 to enable Feature 1, including the graphics component and the display device in response to 30 minutes elapsing. In another embodiment, the component switch 360 can include a timer which can be set by the processor 320, the BIOS, and/or the component switch 360. In response to 30 minutes elapsing, the timer will trigger the component switch 360 to enable the graphics component and the display component.

Figure 4:
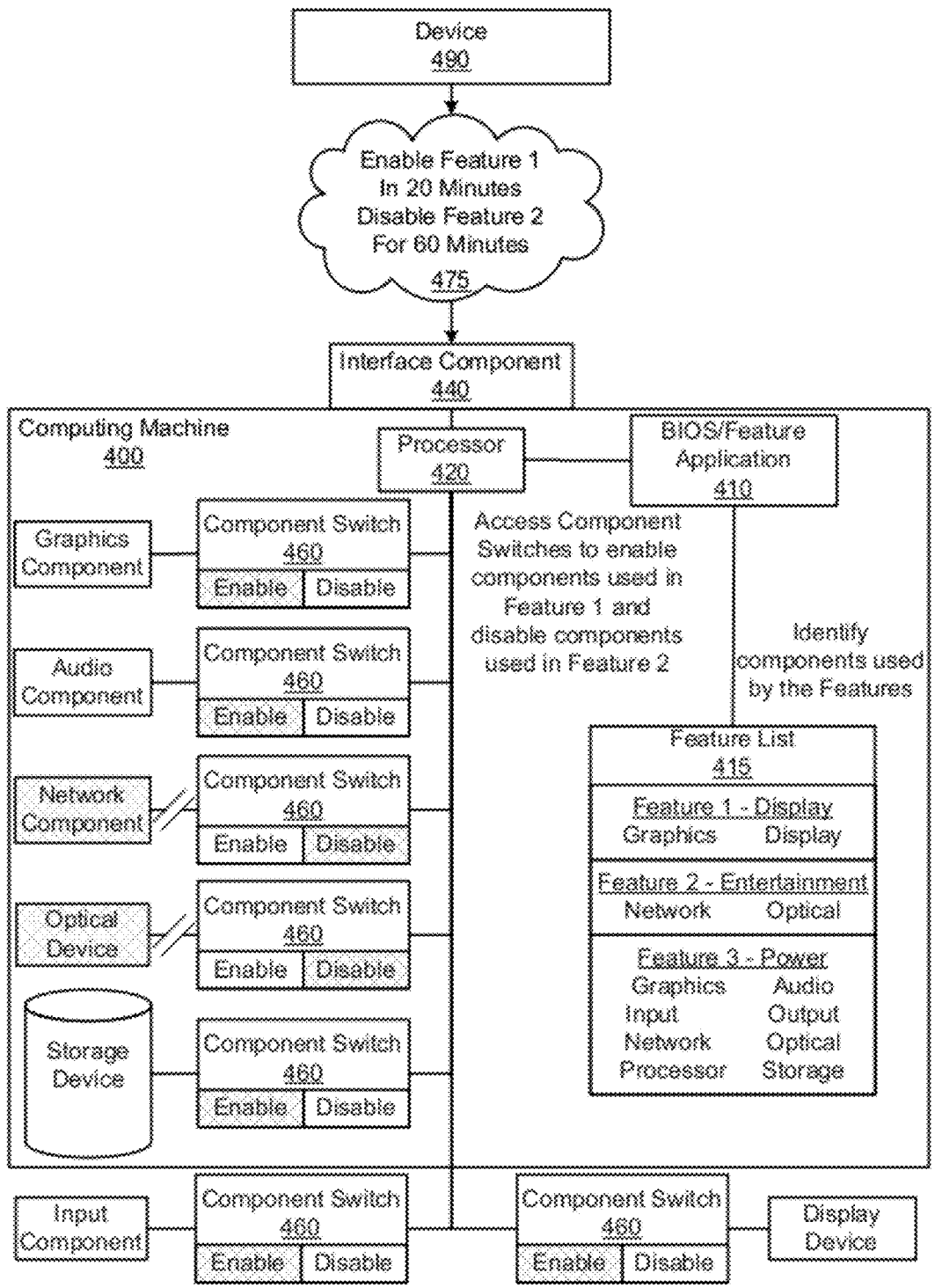
FIG. 4 illustrates a block diagram of a feature application managing features of a computing machine according to another embodiment.

FIG. 4 illustrates a block diagram of a feature application 410 managing features of a computing machine 400 according to another embodiment. As illustrated in the present embodiment and as noted above, the computing machine 400 can include component switches 460 for each of the components of the computing machine 400. The component switches 460 can enable or disable a corresponding component in response to a processor 420 and/or the BIOS accessing the corresponding component switch 460.

As illustrated in FIG. 4, an interface component 440 has detected a feature signal 475 from a device 490 coupled to the computing machine 400. In response to receiving the feature signal 475, the processor 420 and/or the BIOS 410 proceed to analyze the feature signal 475 and identify one or more features of the computing machine 400 to enable and/or disable. As shown in the present embodiment, the processor 420 and/or the BIOS 410 determine that feature signal 475 specifies for Feature 1 to be enabled in 20 minutes and Feature 2 is to be disabled for 60 minutes.

In response to identifying that Feature 1 is to be enabled and that Feature 2 is to be disabled, the processor 420 and/or the BIOS 410 proceed to access the feature list 415 to identify which components of the computing machine 400 are used or supported by Feature 1 and Feature 2. As illustrated in FIG. 4, the processor 420 and/or the BIOS 410 determine that the graphics component and the display device are used or supported by Feature 1. In response the processor 420 and/or the BIOS 410 proceed to access a timer on the computing machine 400 or on the corresponding component switches 460 for the graphics component and the display device. One or more timers are set to have the corresponding component switches 460 of the graphics component and the display device transition from an off state (disabled) to an on state (enabled) after 20 minutes has elapsed.

As illustrated in FIG. 4, the processor 420 and/or the BIOS 410 additionally determine that the network component and the optical drive are used or supported by Feature 2. In response, the processor 420 and/or the BIOS 410 proceed to access the corresponding components switches 460 for the network component and the optical drive to instruct the corresponding component switches 460 to enter an off state (disabled). In one embodiment, the processor 420 and/or the BIOS 410 further access a timer on the computing machine 400 and/or on the corresponding component switches 460 and sets the timer(s) to enable the corresponding component switches 460 for the network component and the optical drive to be in an on state (enable) once 60 minutes has elapsed.

As a result, the computing machine 400 is configured to enable (Feature 1) the graphics component and the display device after 20 minutes and the computing machine 400 is configured to disable (Feature 2) the network component and the optical drive after 60 minutes has elapsed.

Figure 5:
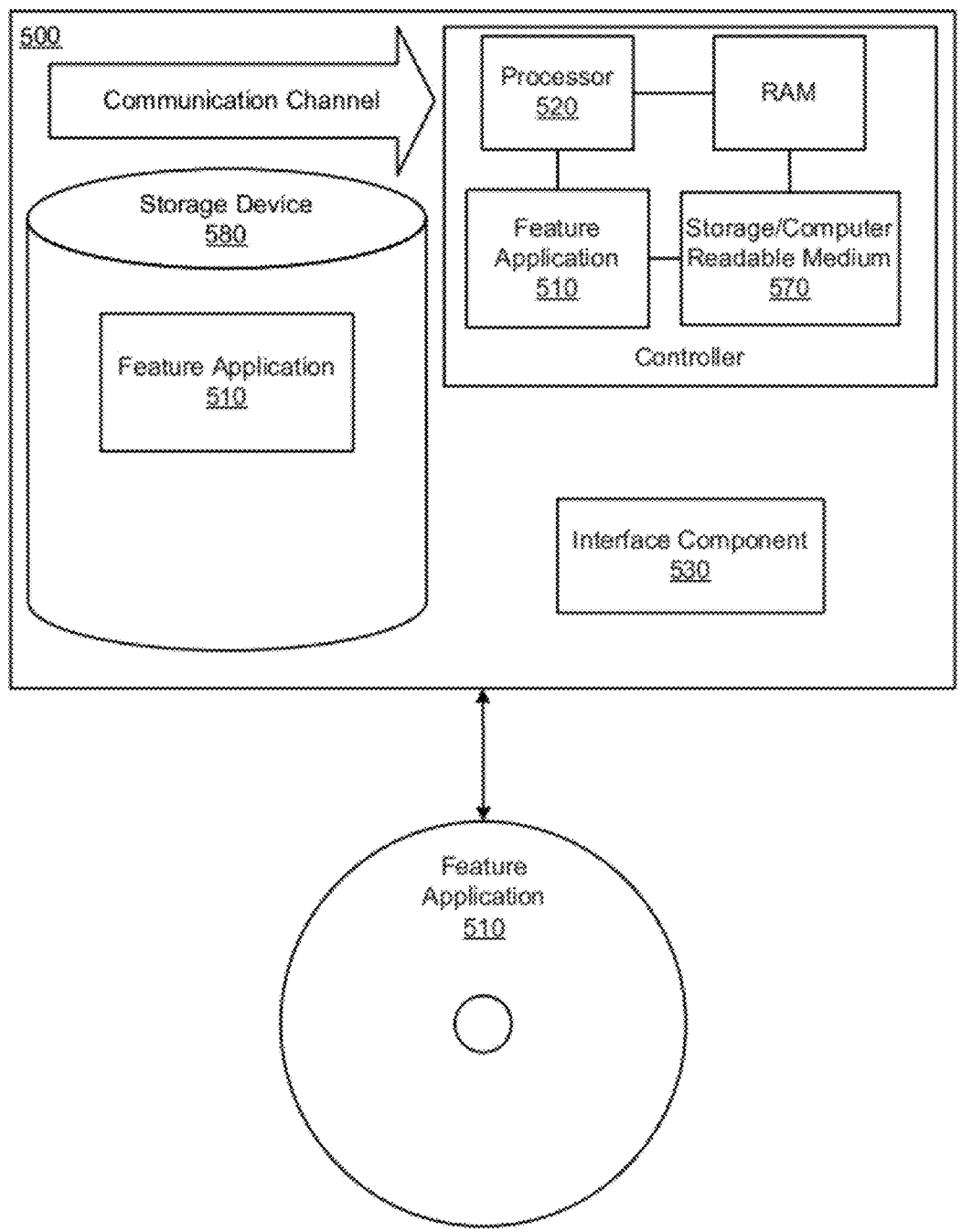
FIG. 5 illustrates a feature application on a computing machine and a feature application stored on a removable medium being accessed by the computing machine according to an embodiment.

FIG. 5 illustrates a computing machine 500 with a feature application 510 and a feature application 510 stored on a removable medium being accessed by the computing machine 500 according to an embodiment. For the purposes of this description, a removable medium is any tangible apparatus that contains, stores, communicates, or transports the application for use by or in connection with the computing machine 500. As noted above, in one embodiment, the storage application 510 is a BIOS or a firmware that is embedded into one or more components of the computing machine 500 as ROM (Read-Only Memory). In other embodiments, the storage application 510 is a software application which is stored and accessed from a hard drive, a compact disc, a flash disk, a network drive or any other form of computer readable medium that is coupled to the computing machine 500.

Figure 6:
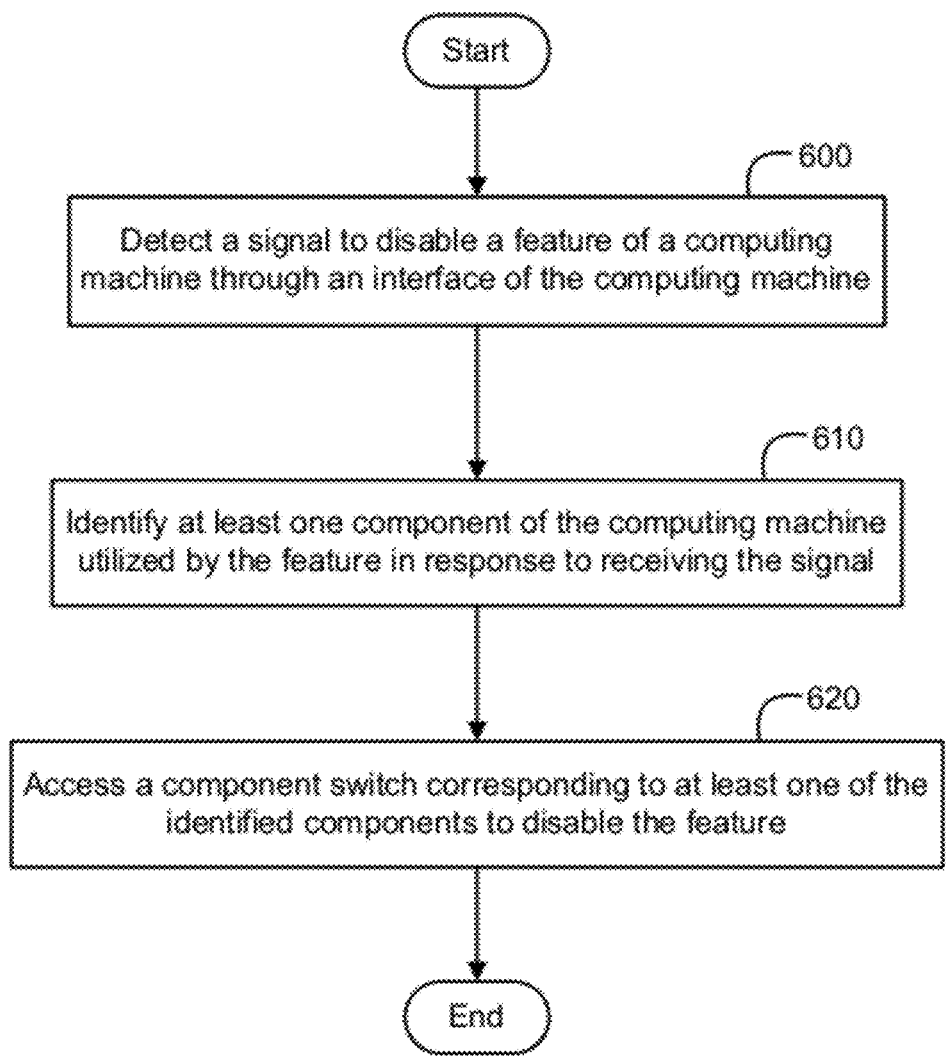
FIG. 6 is a flow chart illustrating a method for managing a computing machine according to an embodiment.

FIG. 6 is a flow chart illustrating a method for managing a computing machine according to an embodiment. The method of FIG. 6 uses a computing machine with a processor, an interface component, at least one component switch, a communication channel, a storage device, and a feature application. In other embodiments, the method of FIG. 6 uses additional components and/or devices in addition to and/or in lieu of those noted above and illustrated in FIGS. 1, 2, 3, 4, and 5.

As noted above, the feature application is an application which can independently or in conjunction with the processor manage the computing machine. In one embodiment, the feature application is a BIOS of the computing machine. The computing machine can be or include a desktop, a laptop, a netbook, a tablet, a server, a PDA, a hand held computing device, and the like.

When managing the computing machine, the processor and/or the feature application can enable or disable one or more features on the computing machine. As noted above, a feature includes a mode of operation of the computing machine where one or more components of the computing machine are used or supported by the feature. In one embodiment, one or more features can include a display feature, an entertainment feature, a communication, feature, and/or a power feature. One or more components of the computing machine can include the processor, an interface component, at least one component switch, a network component, a storage device, a graphics component, an audio component, an optical device, an input device, a display device, and/or any additional device or component coupled to the computing machine.

The processor and/or the feature application can initially instruct the interface component to detect a signal to disable a feature of the computing machine 600. The interface component is a communication device configured to couple with a device and detect one or more feature signals from the device. A feature signal can be a digital or analog signal sent from a communication component of the device through a wired or a wireless connection.

The feature signal can specify for one or more features of the computing machine to disable or enable. In one embodiment, the feature signal also specifies one or more components which are used or supported by the feature. In another embodiment, the feature signal can specify a duration of time for a feature to remain enabled or disabled. In other embodiments, the feature signal can specify when a feature is to become enabled or disabled.

The device can be another computing machine and/or a handheld computing machine which includes a communication component to send one or more feature signals. Similar to the interface component of the computing machine, the communication component can couple with the interface component when the device and the computing machine are coupling. Additionally, the communication component can send one or more feature signals through a wired or wireless connection.

In response to detecting a feature signal from the device, the processor and/or the feature application can proceed to analyze the feature signal to identify one or more features of the computing machine to enable or disable. The processor and/or the feature application also identify at least one component of the computing machine utilized or supported by the feature 610. When identifying one or more components utilized or supported by a feature, the processor and/or the feature application can analyze the feature signal for one or more listed components. In another embodiment, the processor and/or the BIOS can access a feature list accessible to the computing machine to identify one or more components of the computing machine listed to be utilized or supported by a corresponding feature.

In response to identifying the components of the computing machine which are used by a feature included in the feature signal, the processor and/or the feature application proceed to access at least one component switch corresponding to at least one of the identified components to disable the feature and the components utilized or supported by the feature 620. When disabling the feature and the corresponding component utilized or supported by the feature, the processor and/or the feature application access at least one corresponding component switch and instruct it to disable the corresponding components.

As noted above, a component switch can be a mechanical, hardware, and/or software component which can include an on state and an off state. In one embodiment, each of the components of the computing machine can have a corresponding component switch which can enable or disable the corresponding component. In another embodiment, the computing machine can include a component switch which has multiple sub switches. Each of the sub switches can include an on state and an off state. Additionally, each of the sub switches correspond to a component of the computing machine.

When a component switch or a sub switch enters or is in an on state, the corresponding component can be enabled. In one embodiment, when enabled, the corresponding component is powered on and is coupled to a communication channel of the computing machine. When a component switch or a sub switch enters or is in an off state, the corresponding component is disabled. In one embodiment, when disabled, the corresponding component can be powered off. In another embodiment, the corresponding component can be in a low power state. In other embodiments, the corresponding component can be decoupled from a communication channel of the computing machine.

One or more component switches and/or sub switches can enter and/or transition between the on state and the off state in response instructions by the processor and/or the feature application. The method is then complete or the interface component can continue to detect one or more feature signals to enable and/or disable a feature of the computing machine. In other embodiments, the method of FIG. 6 includes additional steps in addition to and/or in lieu of those depicted in FIG. 6.

Figure 7:
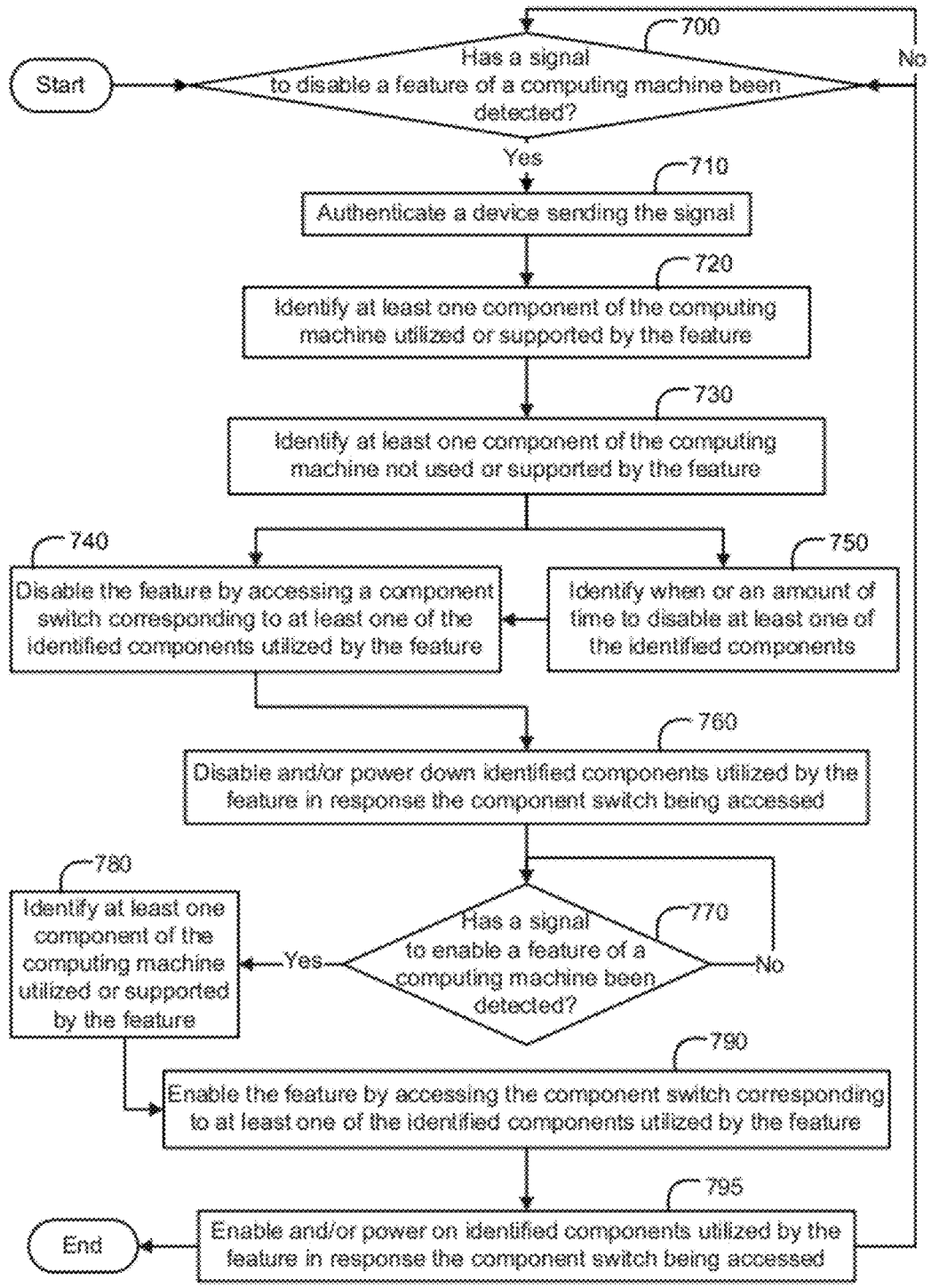
FIG. 7 is a flow chart illustrating a method for managing a computing machine according to another embodiment.

FIG. 7 is a flow chart illustrating a method for managing a computing machine according to another embodiment. Similar to the method disclosed above, the method of FIG. 7 uses a computing machine with a processor, an interface component, at least one component switch, a communication channel, a storage device, and a feature application. In other embodiments, the method of FIG. 7 uses additional components and/or devices in addition to and/or in lieu of those noted above and illustrated in FIGS. 1, 2, 3, 4, and 5.

As illustrated in FIG. 7, a processor and/or the feature application initially determine whether a feature signal to disable a feature of the computing machine has been detected by instructing an interface component of the computing machine to detect one or more feature from a device 700. As noted above, the interface component is a communication device or component of the computing machine which can couple with the device through a communication component of the device when the device couples to the computing machine.

In one embodiment, the device includes a user interface which lists one or more features available on the computing machine. The user interface can additionally list one or more components which are utilized or supported by the feature. The device and/or a user of the device can use the interface user to select a feature and one or more components of the computing machine to disable. Additionally, the user interface can allow the user or the device to enable or disable a corresponding feature.

In response to one or more features being selected to disable, a communication component of the device proceeds to send and/or broadcast a feature signal to disable a selected feature of the computing machine. If the interface component does not detect any feature signal, the interface component continues to scan for a feature signal to disable a feature of the computing machine 700. In one embodiment, if the interface component detects a feature signal to disable a component, the processor and/or the feature application can initially authenticate the device which is sending the feature signal 710.

When authenticating the device, the processor and/or the feature application can prompt the device for an identification, a password, a key, and/or a secret which can be compared to a predefined authentication. If a match is found, the device will have been authenticated. In response the device being successfully authenticated, the processor and/or the feature application will proceed to identify at least one component of the computing machine which is utilized or supported by the feature 720. Additionally, the processor and/or the feature application can identify at least one component of the computing machine which is not used or supported by the feature 730.

When identifying which components are used by a feature and which components are not used by the feature, the processor and/or the feature application can access the feature signal to determine whether any components are listed to be utilized or supported by the feature. In another embodiment, the computing machine can access a feature list which lists one or more features of the computing machine and the corresponding components which are used or supported by the features.

In response to identifying which of the components to disable, the processor and/or the feature application can identify when or an amount time to disable at least one of the corresponding components 750. If a time is specified, the processor and/or the feature application can access a timer on the computing machine, on a corresponding component switch, and/or on a corresponding sub switch and proceed to instruct the timer(s) to trigger the corresponding component switch or sub switch to disable the corresponding components at the specified time.

In one embodiment, the feature signal can also have specified a time for a feature to become disabled or enabled. If a time is specified, the processor and/or the feature application can access one or more timers to delay the disabling and/or enabling of a feature. Once the time has been reached, one or more timers will trigger and a corresponding component switch or sub switch can be accessed to disable or enable the components.

Once the timer(s) have been set, the processor and/or the feature application proceed to disable the feature by accessing at least one component switch corresponding to at least one of the identified components once the time has been reached 740. If an amount of time to disable the feature was previously defined, the processor and/or the feature application additionally access the corresponding component switches or sub switches to enable to the components in response to the time elapsing. In another embodiment, if no time was defined for the feature to become disabled and if no amount of time was defined for the feature to remain disabled, the processor and/or the feature application will proceed to disable the feature by accessing a component switch corresponding to at least one of the identified components utilized by the feature 740.

In one embodiment, the computing machine includes a single component switch which is coupled to sub switches for each of the components of the computing machine. When disabling the identified components, the processor, the feature application, and/or the component switch can access the corresponding sub switches and switch them to an off state. As noted above, when in an off state, the corresponding component can be disabled. In one embodiment, the corresponding component can also be powered off, enter a low power state, and/or be decoupled from a communication channel of the computing machine. In another embodiment, the computing machine can include corresponding component switches for each of the components of the computing machine. When disabling the identified components, the processor and/or the feature application can access the corresponding component switches for the identified components and switch them to an off state when disabling the components and the feature.

In response to the timers being set, the identified components utilized or supported by the feature can be disabled and/or powered down by accessing one or more corresponding component switches or sub switches 760. In one embodiment, the processor and/or the feature application continue to detect for a signal to enable or disable a feature of the computing machine 770. If a second or another feature signal is received to disable another feature, the processor and/or the feature application can repeat the process noted above and the processor and/or the feature application can continue to detect for a signal to enable or disable a feature of the computing machine 770.

If the processor and/or the feature application receive a feature signal specifying to enable a feature, the processor and/or the feature application identify at least one component of the computing machine which is utilized or supported by the feature 780. In response to identifying one or more components utilized or supported by the feature, the processor and/or the feature application proceed to enable the feature by accessing at least one component switch or sub switch corresponding to at least one of the identified components 790.

When enabling a corresponding component, the corresponding component switch or sub switch would be instructed by the processor and/or the feature application to enter an on state in response to being accessed 795. As noted above, when enabled, the corresponding component can be powered on and can be coupled to a communication channel of the computing machine. The process is then complete or the interface component can continue to detect for one or more feature signals from the device 700. In other embodiments, the method of FIG. 7 includes additional steps in addition to and/or in lieu of those depicted in FIG. 7.

What is claimed is:

1. A method for managing a computing machine comprising:
    detecting a signal to disable a feature of the computing machine through an interface of the computing machine;
    authenticating a device in response to the computing machine receiving the signal to disable the feature from the device;
    identifying at least one component of the computing machine utilized by the feature in response to receiving the signal; and
    accessing a component switch corresponding to at least one of the identified components to disable the feature.

2. The method for managing a computing machine of claim 1 further comprising disabling at least one of the identified components in response to accessing the component switch.

3. The method for managing a computing machine of claim 2 further comprising identifying an amount of time for at least one of the identified components to remain disabled.

4. The method for managing a computing machine of claim 3 further comprising accessing the component switch to enable at least one of the identified components in response to the amount of time elapsing.

5. The method for managing a computing machine of claim 1 further comprising identifying at least one component of the computing machine to not disable.

6. The method for managing a computing machine of claim 5 wherein a component is not disabled by the computing machine if the component is not utilized by the feature.

7. The method for managing a computing machine of claim 1 further comprising detecting a second signal to enable the feature of the computing machine and accessing the component switch corresponding to at least one of the identified components to enable the feature.

8. The method for managing a computing machine of claim 7 further comprising enabling at least one of the identified components in response to the component switch being accessed.

9. A computing machine comprising:
    an interface component to detect a signal to manage a feature of the computing machine;
    at least one component to support the feature;
    a component switch to disable and enable at least one of the components; and
    a processor to authenticate a device in response to the computing machine detecting the signal to disable the feature from the device and access the component switch to disable the feature in response to identifying at least one component to disable based on the signal.

10. The computing machine of claim 9 wherein at least one of the components are powered down when disabling the feature.

11. The computing machine of claim 9 wherein at least one of the components enter a low power state when disabling the feature.

12. The computing machine of claim 9 wherein the interface component includes at least one from the group consisting of a network interface, a serial interface, a USB interface, a SATA interface, a ESATA interface, a PCIE interface, and a port replicator.

13. The computing machine of claim 9 wherein a component of the computing machine includes at least one from the group consisting of a graphics components, an audio component, a network component, an input component, an optical device, a storage device, and a display device.

14. The computing machine of claim 9 wherein a BIOS of the computing machine identifies at least one component which supports the feature.

15. The computing machine of claim 14 wherein the BIOS identifies at least one component which is not utilized by the feature.

16. The computing machine of claim 14 wherein a device includes communication component configured to couple with the computing machine and send the BIOS the signal to disable the feature.

17. The computing machine of claim 16 wherein the device includes a user interface which lists at least one feature of the computing machine which can be disabled and at least component of the computing machine supported by a feature.

18. A non-transitory computer-readable program in a computer-readable medium comprising:
- a feature application to detect a signal to disable a feature of a computing machine through an interface of the computing machine;
- wherein the feature application authenticates a device in response to the computing machine detecting the signal to disable the feature from the device;
- wherein the feature application identifies at least one component of the computing machine configured to support the feature; and
- wherein the feature application disables the feature by accessing a component switch corresponding to at least one of the identified components.

19. The non-transitory computer-readable program in a computer-readable medium of claim 18 wherein the component switch includes at least one sub switch coupled to at least one of the components.

* * * * *

UNITED STATES PATENT AND TRADEMARK OFFICE
CERTIFICATE OF CORRECTION

PATENT NO. : 8,478,979 B2  
APPLICATION NO. : 12/878681  
DATED : July 2, 2013  
INVENTOR(S) : Richard H. Hodge Page 1 of 1

It is certified that error appears in the above-identified patent and that said Letters Patent is hereby corrected as shown below:

In the Claims:

In column 12, line 21, in Claim 2, delete "claim" and insert -- claim 1 --, therefor.

Signed and Sealed this
Nineteenth Day of November, 2013

Teresa Stanek Rea
*Deputy Director of the United States Patent and Trademark Office*